United States Patent [19]

Stagnitti

[11] Patent Number: 5,466,890
[45] Date of Patent: Nov. 14, 1995

[54] EXPANSION JOINT FOR AN ELECTRICAL CONDUIT WHICH IS ELECTRICALLY GROUNDED THROUGH THE EXPANSION JOINT

[75] Inventor: Brian M. Stagnitti, Midvale, Utah

[73] Assignee: Cooper Industries, Inc., Houston, Tex.

[21] Appl. No.: 215,530

[22] Filed: Mar. 22, 1994

[51] Int. Cl.[6] .................................................. H02G 15/08
[52] U.S. Cl. ............... 174/84 R; 174/12 R; 174/12 BH; 174/21 R; 174/65 R; 174/65 SS; 174/75 C; 174/78; 439/33; 439/95; 439/210
[58] Field of Search ...................... 174/84 R, 78, 174/65 R, 65 SS, 89, 75 C, 75 R, 21 R, 19, 12 R, 12 BH, 13; 439/207, 210, 33, 95

[56] References Cited

U.S. PATENT DOCUMENTS

| Re. 33,611 | 6/1991 | Michaels et al. | 439/610 |
|---|---|---|---|
| 2,530,381 | 11/1950 | Donohue, Jr. | 174/18 |
| 2,695,942 | 11/1954 | Darner | 219/60 R |
| 3,057,951 | 10/1962 | Blakely | 174/78 |
| 3,154,632 | 10/1964 | Browne | 174/86 |
| 3,318,992 | 5/1967 | Huber | 174/73.1 |
| 3,424,853 | 1/1969 | Johnson, III | 174/35 GC |
| 3,739,076 | 6/1973 | Schwartz | 174/78 |
| 3,783,178 | 1/1974 | Philibert et al. | 174/86 |
| 3,818,421 | 6/1974 | Kruger | 439/578 |
| 3,830,957 | 8/1974 | Oberdiear | 174/78 |
| 4,032,205 | 6/1977 | Taj | 174/78 |
| 4,213,664 | 7/1980 | McClenan | 439/95 |
| 4,250,350 | 2/1981 | Polimine | 174/86 |
| 4,390,218 | 6/1983 | Kruger | 439/33 |
| 4,547,623 | 10/1985 | Van Brunt et al. | 174/35 R |
| 4,558,173 | 12/1985 | Gajajiva et al. | 174/86 |

*Primary Examiner*—Morris H. Nimmo
*Attorney, Agent, or Firm*—Burns, Doane, Swecker & Mathis

[57] ABSTRACT

Two electrical conduit sections are attached to a thermal expansion joint which permits relative axial movement between the conduit sections. One of the conduit sections has an end portion which is axially slidably disposed inside of the expansion joint. A ring shaped grounding element is mounted on a screw thread formed in that slidable end portion and is disposed in sliding connection with a cylindrical surface of the joint which surrounds the slidable end portion.

22 Claims, 2 Drawing Sheets

EXPANSION JOINT FOR AN ELECTRICAL CONDUIT WHICH IS ELECTRICALLY GROUNDED THROUGH THE EXPANSION JOINT

BACKGROUND OF THE INVENTION

The present invention relates to expansion joints for use with electrical conduits and, in particular, to the electrical grounding of such expansion joints.

It is conventional to run electric wiring within a metal conduit and to electrically ground the conduit to protect persons who may come into contact with the conduit. In certain instances it may be desirable to form the conduit as separate sections interconnected by a thermal expansion joint for permitting relative movement between the conduit sections in response to ambient temperature fluctuations. It then becomes necessary to maintain the continuity of the electrical ground across the expansion joint.

A conventional expansion joint 10 depicted in FIG. 1 is connected to first and second sections 12A, 12B of a metal conduit for electrical wiring (not shown). The expansion joint 10 comprises a metal reducer 14 having one end threaded onto an end of the first conduit section 12A, and another end threaded to a cylindrical metal sleeve 16. Threaded to an opposite end of the sleeve 16 is a metal gland nut 18 which encompasses a fiber gasket 20, a steel washer 22 and a packing 24. The packing may comprise an asbestos and copper braid and functions to resist the entry of moisture into the interior of the sleeve 16. The second conduit section 12B passes through the packing 24, and the packing is compressed against the second conduit section 12B by tightening the gland nut 18. A plastic throat bushing 26 is screw-threaded onto the end of the second conduit section 12B to provide a smooth inner diameter against with the wires can engage.

Linear movement of the second conduit section 12B relative to the expansion joint 10 in response to thermal variations is possible since the second conduit section is slidable relative to the packing 24.

In order to maintain electrical ground continuity from the conduit section 12A to the conduit section 12B, a grounding device 30 is connected between the conduit sections 12A, 12B. That grounding device comprises a metal grounding strap 32 connected to respective conduit sections 12A, 12B by means of clamps 34A, 34B. Such a grounding device is relatively expensive and bulky and is susceptible to environmental and/or handling damage since it is entirely exposed.

Another type of grounding device proposed in U.S. Pat. No. 3,154,632 comprises a braided copper ring positioned around the outer circumference of a portion of the conduit section located within the gland nut. The copper ring is located axially between the packing and the end of the gland nut. When the gland nut is tightened, the copper ring is wedged into contact with the outer periphery of the conduit section by the gland nut and thereby maintains the electrical ground. In practice, however, thermally-induced relative movement between the expansion joint and that conduit section results in the specially-applied outer plating of the conduit section being frictionally abraded away by the copper ring. The conduit section located beneath the abraided region of the plating is then exposed to the ambient environment (e.g. rain, etc.) as the conduit section moves out from the gland nut (during thermally-induced expansion/contraction).

Proposals have been made for providing an electrical ground by means of a ring shaped grounding device mounted on the outside of a cable and situated inside of a connector. Attention is directed for example to U.S. Pat. No. 4,213,664 which discloses a grounding device in the form of a garter spring disposed within a connector in encircling relationship to a cable. The garter spring is sandwiched between an inclined cam face and a compression ring of the connector. In order to cause the garter spring to contact the cable, portions of the connector are moved longitudinally relative to one another to converge the cam face toward the compression ring in order to force the garter spring radially inwardly toward the cable. Provision is made to enable a user to look through the connector and visually inspect the garter spring in order to ensure that a proper grounding connection has been established.

It would be desirable to enable a grounding device to be mounted without requiring a special manipulation of a connector or visual inspection, and without risking abrasion of the outer plating of a conduit section. Also, it would be desirable to provide a grounding device which can be easily retrofit on existing expansion joints.

SUMMARY OF THE INVENTION

The present invention relates to a electrical conduit structure comprising an expansion joint interconnecting first and second coaxial sections of a conduit to permit relative axial movement between the first and the second conduit sections. The expansion joint is affixed to a first end portion of the first conduit section and includes an electrically conductive internal surface defining an internal space in which a second end portion of the second conduit section is disposed for axial movement relative to the internal surface. An electrical grounding device is provided for establishing an electrical ground between the first and second conduit sections through the expansion joint. The electrical grounding device comprises an electrically conductive ring-shaped grounding element mounted coaxially on the second end portion so as to be movable axially therewith relative to the internal surface. An outer periphery of the ring-shaped grounding element is disposed in sliding contact with the internal surface.

The grounding element is preferably mounted on an external thread of the second end portion. The grounding element can be constrained against axial movement relative to the second end portion by being sandwiched between a retaining nut and a retaining ring coaxially mounted on the second end portion. The retaining nut is screw-threaded to the second end portion.

Alternatively, the grounding element could be mounted on a separate retaining member which is threadedly attached to the external thread of the second end portion. Also, alternatively, the grounding element could be provided with an internal screw thread which is threadedly connected to the external screw thread of the second end portion.

The grounding element could be in the form of a garter spring, or a wire brush, for example.

The invention also pertains to a method of maintaining ground continuity between first and second coaxial electrical conduit sections which are interconnected by an expansion joint which permits relative axial movement between the conduit sections. The method comprises mounting an electrically conductive element of ring shape onto an end portion of one of the conduit sections. That one conduit section is disposed within the expansion joint for axial movement relative thereto. An outer periphery of the element is in sliding contact with an electrically conductive inside surface of the expansion joint. The one end portion is permitted to slide axially relative to the expansion joint so that the grounding element rubs frictionally against the inside surface.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS OF THE INVENTION

Figure 1:
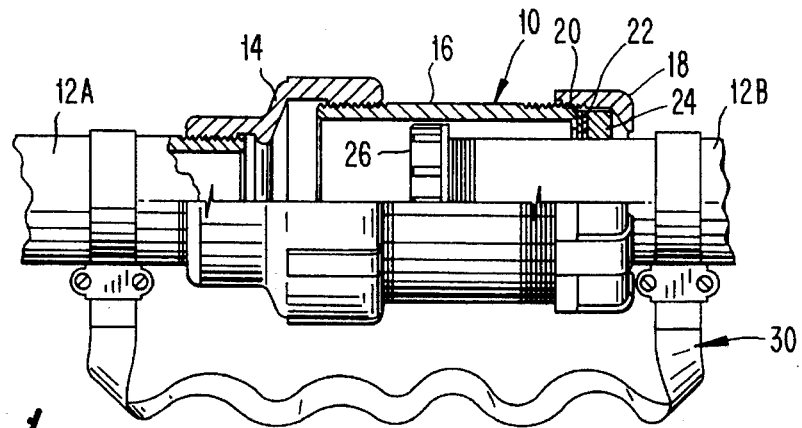
FIG. 1 is a side elevational view, partially broken away, of a prior art conduit structure including an expansion joint.
Figure 2:
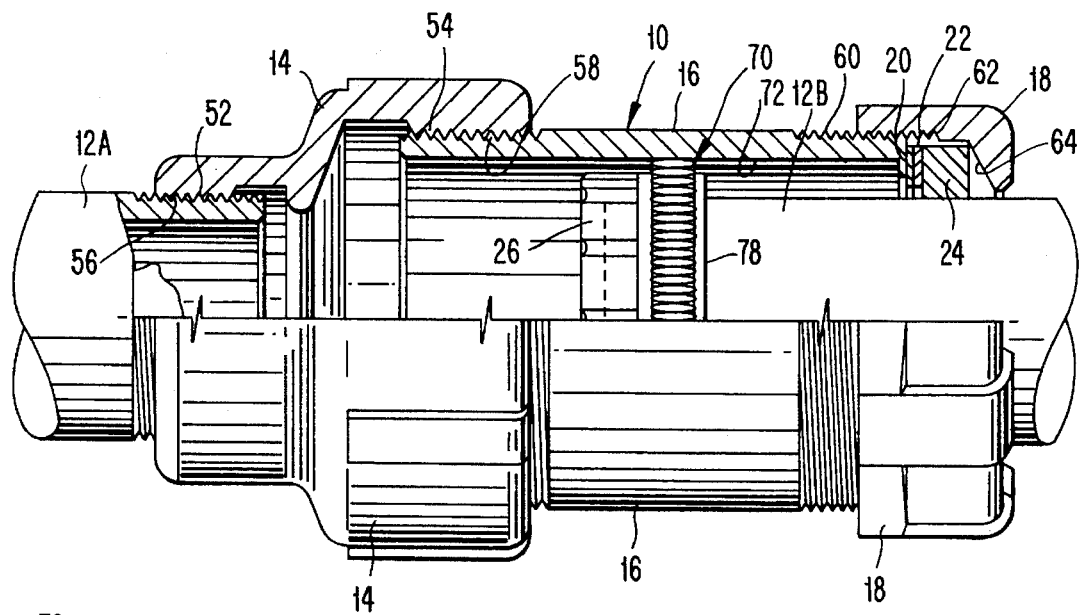
FIG. 2 is a view similar to FIG. 1 employing a grounding element according to a first embodiment of the present invention.
Figure 3:
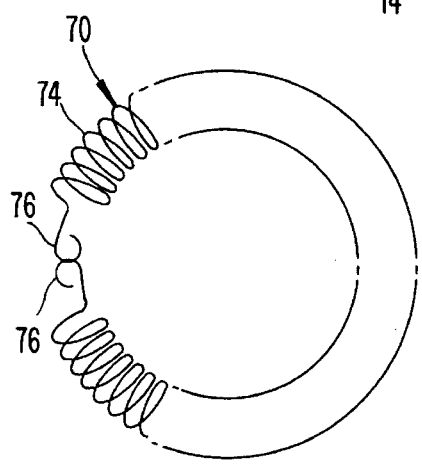
FIG. 3 is an axial view of the grounding element depicted in FIG. 2.
Figure 4:
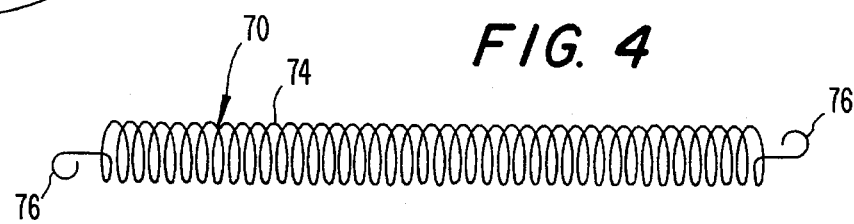
FIG. 4 is a side elevational view of the grounding element of FIG. 3 in a non-assembled state.

An electrical conduit structure according to a first preferred embodiment of the present invention depicted in FIGS. 2–4 comprises the expansion joint 10 described earlier herein, and the first and second conduit sections 12A, 12B. The reducer 14 of the expansion joint is open at both ends, and each end thereof includes an internal (female) screw thread 52, 54. Those threaded ends of the reducer are threadedly connected to external (male) screw threads 56, 58 of the first conduit section 12A and the sleeve 16 of the expansion joint, respectively. The sleeve 16 is cylindrical and open at both ends. Each end of the sleeve contains an external screw thread 58, 60, one of which 58 is connected to the reducer 14 as noted above, and the other 60 of which is connected to the internal screw thread 62 of the gland nut 18. The gland nut 18 includes an inclined end surface 64 which bears against a stack composed of the gasket 20, the washer 22, and the packing 24 to push the stack against an end face of the sleeve 16, and to compress the packing 24 radially inwardly against an end portion of the second conduit section 12B. The packing 24 creates a seal which resists the entry of moisture into the space defined by the sleeve 16.

In accordance with the present invention, continuity of an electrical ground between the conduit sections 12A and 12B is produced by a ring-shaped element 70 which is fitted coaxially onto the end of the second conduit section 12B so as to be disposed within the interior of the expansion joint 10, i.e., within the space defined by the sleeve 16, and arranged to be in electrical contact with both the outer periphery of the second conduit section 12B and an inner surface 72 of the sleeve 16, as depicted in FIG. 2. The element 70 comprises a helically coiled metal wire 74 arranged in annular configuration to form a garter spring type structure as depicted in FIG. 3. The wire includes hooks 76 at its ends which are interconnected to maintain the annular shape.

The annular element 70 is slipped over the externally threaded end of the second conduit section (after the throat bushing 26 has been temporarily removed) and becomes sandwiched between the throat bushing 26 and a split washer 78 (formed of brass for example) after the bushing 26 has been re-attached to the conduit section 12B by being screwed thereon. The throat bushing 26 thus serves as a retaining member to retain the element 70. The inner diameter of the split washer is engaged between successive threads so as to be affixed against axial movement. When the threaded end of the second conduit section is inserted axially into the sleeve 16, the element 70 will be compressed radially between the outer surface of the second conduit section 12B and the interior surface 72 of the sleeve 16 in order to electrically interconnect the second conduit section 12B and the expansion joint 10. This, then provides for continuity of the ground, since the sleeve 16 is in electrical contact with the first conduit section 12A through the reducer 14.

Since the grounding element 70 is disposed inside of the expansion joint, it will be protected from damage due, for example, to environmental conditions and handling. No relative axial movement will occur between the element 70 and the conduit section 12B, so the outer protective plating of the conduit section will not be abraided. Thus, the conduit section will still be protected by the plating, even if water were to leak into the expansion joining past the packing 24.

Relative axial movement can occur between the second conduit section 12B and the expansion joint 10. During that relative axial movement the outer periphery of the element 70 will scrape fictionally along the inside surface 72 of the sleeve 16 to remove dirt, dust, etc. That is, the contact joint will be self-cleaning.

The element 70 can be formed of any suitable electrically conductive material, preferably spring temper phosphor bronze.

Figure 5:
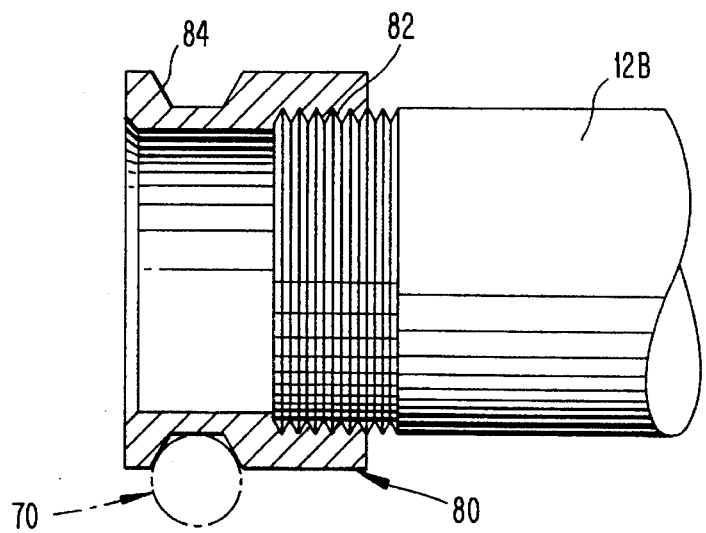
FIG. 5 is a longitudinal sectional view through an alternative structure for mounting the grounding element depicted in FIG. 3.

In lieu of placing the element 70 directly onto the screw thread of the second conduit section 12B, the element 70 can be mounted indirectly to that screw thread. For example, there could be provided a metal bushing 80 depicted in FIG. 5. That bushing 80 has an internal screw thread 82 formed at one end, and an annular external groove 84 formed at the opposite end. In use, the element 70 would be stretched radially and slipped into the groove 84, as shown in phantom lines in FIG. 5. The bushing 80 would then be screwed onto the threaded end of the second conduit section 12B. The bushing 80 could be formed of any suitable electrically conductive material, such as aluminum or steel/zinc.

Figure 6:
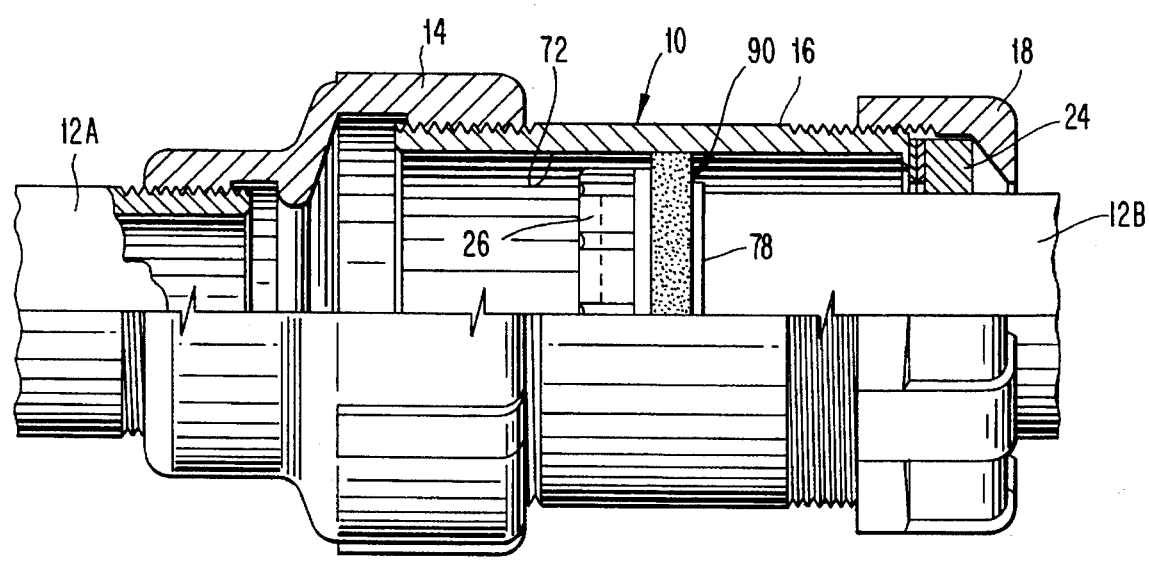
FIG. 6 is a view similar to FIG. 2 of an electrical conduit structure employing a grounding element according to a second embodiment of the invention.
Figure 7:
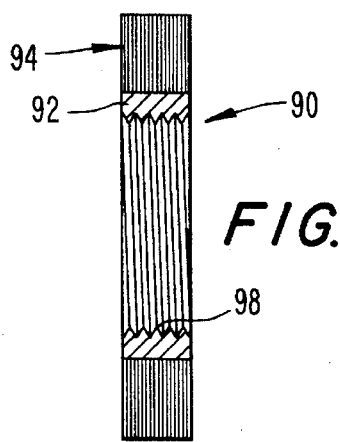
FIG. 7 is a longitudinal sectional view taken through the grounding element depicted in FIG. 6.
Figure 8:
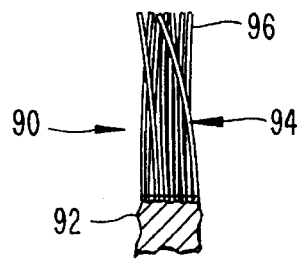
FIG. 8 is an enlarged fragmentary view of FIG. 7.

A second embodiment of the grounding element, depicted in FIGS. 6–8, employs a ring-shaped grounding element in the form of a wire brush ring 90. That brush ring 90 comprises a metal hub 92 and a dense mesh 94 of metal wire bristles 96 projecting generally radially outwardly from the hub 92. The inner diameter of the hub 92 contains a screw thread 98 to enable the element 90 to be directly threaded onto the threaded end of the second conduit section 12B.

When the second conduit section 12B, carrying the element 90, is inserted into the sleeve 16, the outer periphery of the bristle mesh 94 will bear fictionally against the inner surface 72 of the sleeve 16 to electrically interconnect the second conduit section 12B and the sleeve 16.

For the same reasons explained in connection with the earlier described element 70, the element 90 will be protected from environmental and handling damage, and the electrical contact joint will be self-cleaning.

The element 90 can be formed of any suitable electively conductive material, such as brass or aluminum for example.

To assemble the grounding element 70 or 90 onto an existing conduit structure, an operator disconnects the sleeve 16 from the reducer 14 and slides the unit 16, 18, 20, 22, 24, axially along the second conduit section 12B to expose the threaded end of the latter. The throat bushing 26 is then removed from the second conduit section 12B, and the element 70 or 90 is inserted onto the second conduit section 12B. In the case of the element 70, that element can be slipped directly onto the external thread of the second conduit section 12B to be sandwiched between the split washer 78 and the throat bushing 26, or the element 70 can be mounted on the metal bushing 80, before or after the latter is threaded onto the second conduit section 12B.

In the case of the element 90, that element is threaded directly onto the second conduit section 12B, followed by the throat bushing 26.

Thereafter, the unit 16, 18, 20, 22, 24 is slid axially toward the reducer 14, and the sleeve 16 is reattached to the reducer 14. In so doing, the outer periphery of the element 70 or 90 makes frictional (electrically conductive) contact with the inner surface 72 of the sleeve 16.

The grounding element according to the present invention is of simple, inexpensive construction, is easy to install, is protected against environmental and handling damage, and forms a self-cleaning contact joint as explained earlier herein. No damage to the outer plating of the conduit section 12B can occur, because the grounding element will not rub axially thereagainst. Hence, even if the interior of the sleeve 16 becomes wet, the conduit section 12B will remain resistant to rusting or other types of water damage.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

I claim:

1. An electrical conduit structure comprising an expansion joint interconnecting coaxial first and second sections of an electrical conduit to permit relative axial movement between said first and second conduit sections; said expansion joint being affixed to a first end portion of said first conduit section and including an electrically conductive internal surface defining an internal space in which a second end portion of said second conduit section is disposed for axial movement relative to said internal surface; electrical grounding means for establishing an electrical ground between said first and second conduit sections through said expansion joint, said electrical grounding means comprising an electrically conductive ring-shaped grounding element mounted coaxially on said second end portion so as to be movable axially therewith relative to said internal surface; an outer periphery of said ring shaped grounding element disposed in sliding contact with said internal surface.

2. An electrical conduit structure according to claim 1 wherein said second end portion has an external screw thread; a retaining member being threadedly connected to said screw thread for axially retaining said grounding element on said second end position.

3. An electrical conduit structure according to claim 1 wherein said second end portion has an external screw thread, said ring-shaped grounding element situated directly upon said screw thread.

4. An electrical conduit structure according to claim 3 further including a retaining nut threadedly connected to said screw thread, said ring-shaped grounding element being sandwiched axially between said nut and a retaining ring mounted on said second end portion.

5. In electrical conduit structure according to claim 4 wherein said ring-shaped grounding element is in the form of a garter spring.

6. An electrical conduit structure according to claim 3 wherein an internal screw thread is disposed on an inner circumference of said ring-shaped grounding element and is threadedly connected to said external screw thread.

7. An electrical conduit structure according to claim 6 wherein said ring-shaped grounding element is in the form of a wire brush.

8. An electrical conduit structure according to claim 2 wherein said retaining member comprises an electrically conductive bushing threadedly connected to said screw thread and including an annular external groove in which said ring-shaped grounding element is mounted.

9. An electrical conduit structure according to claim 8 wherein said ring-shaped grounding element is in the form of a garter spring.

10. An electrical conduit structure according to claim 1 wherein said expansion joint includes:

an electrically conductive open-ended reducer having first and second internal screw threads at opposite ends thereof, said first internal screw thread being connected to an external screw thread of said first conduit section;

an electrically conductive cylindrical sleeve having first and second external screw threads at opposite ends thereof, said first external screw thread being connected to said second internal screw thread and possessing said internal surface;

a nut having an internal screw thread connected to said second external screw thread, and a packing disposed within said nut and surrounding said second end portion.

11. A grounding element for use on a screw threaded electrical conduit, comprising a ring-shaped hub having a screw thread on its internal circumference and wire bristles projecting from its outer circumference.

12. An electrical conduit structure comprising an expansion joint interconnecting coaxial first and second sections of an electrical conduit to permit relative axial movement between said first and second conduit sections; said expansion joint being affixed to a first end portion of said first conduit section and including an electrically conductive internal surface defining an internal space in which a second end portion of said second conduit section is disposed for axial movement relative to said internal surface; said second end portion having an external screw thread; electrical grounding means for establishing an electrical ground between said first and second conduit sections through said expansion joint, said electrical grounding means comprising an electrically conductive element mounted on said external screw thread and disposed in sliding contact with said internal surface.

13. An electrical conduit structure according to claim 12 including a retaining member mounted on said external screw thread for axially retaining said grounding element on said second end portion.

14. An electrical conduit structure according to claim 12 wherein said grounding element is axially sandwiched between said retaining member and a retaining ring coaxially mounted on said second end portion.

15. An electrical conduit structure according to claim 13 wherein said grounding element is mounted on said retaining member which is formed of an electrically conductive material.

16. An electrical conduit structure according to claim 12 wherein said grounding element has an internal screw thread mounted on said external screw thread.

17. An electrical conduit structure according to claim 12 wherein said expansion joint comprises:

an electrically conductive open-ended reducer having first and second internal screw threads at opposite ends thereof, said first internal screw thread being connected to an external screw thread of said first conduit section;

an electrically conductive cylindrical sleeve having first and second external screw threads at opposite ends thereof, said first external screw thread being connected to said second internal screw thread and possessing said internal surface;

a nut having an internal screw thread connected to said second external screw thread, and a packing disposed within said nut and surrounding said second end portion.

18. A method of maintaining ground continuity between first and second coaxial electrical conduit sections which are interconnected by an expansion joint to permit relative axial movement between said conduit sections, comprising mounting an electrically conductive element of ring shape onto an end portion of one of said conduit sections, said one conduit section being disposed within said expansion joint for axial movement relative thereto, with an outer periphery of said element being in sliding contact with an electrically conductive inside surface of said expansion joint, and permitting said one end portion to slide axially relative to said expansion joint that said grounding element rubs functionally against said inside surface.

19. A method according to claim 18 wherein said end portion includes an external screw thread, said mounting step including retaining said element against axial movement relative to said end portion by attaching retaining means to said screw thread.

20. A method according to claim 19 wherein said mounting step comprises mounting said element directly onto said screw thread and sandwiching said element between a retaining ring and a nut, said nut being connected to said end portion by being screwed onto said screw thread.

21. A method according to claim 19, wherein said retaining means comprises an internal screw thread mounted on an inner circumference of said element, said mounting step comprising screwing said internal thread onto said internal thread.

22. A method according to claim 19 wherein said retaining means comprises an electrically conductive bushing having an internal screw thread and an annular external groove, said mounting step comprising mounting said element in said groove and screwing said internal thread onto said external thread.

* * * * *